United States Patent [19]

Krueger et al.

[11] Patent Number: 4,800,568

[45] Date of Patent: Jan. 24, 1989

[54] GAS LASER WITH A FREQUENCY-SELECTIVE DIELECTRIC LAYER SYSTEM

[75] Inventors: Hans Krueger, Munich, Fed. Rep. of Germany; Hans P. Good, Sargans, Switzerland

[73] Assignee: Siemens Aktiengesellschaft & Balzers Aktiengesellschaft, Berlin and Munich, Fed. Rep. of Germany

[21] Appl. No.: 823,641

[22] Filed: Jan. 29, 1986

[30] Foreign Application Priority Data

Jan. 30, 1985 [DE] Fed. Rep. of Germany ....... 3503092

[51] Int. Cl.$^4$ ............................................. H01S 3/08
[52] U.S. Cl. ...................................... 372/99; 372/103; 372/108; 372/55; 350/164; 350/166
[58] Field of Search ..................... 372/99, 92, 98, 108, 372/107, 102, 33, 55; 350/164, 166

[56] References Cited

U.S. PATENT DOCUMENTS

| | | | |
|---|---|---|---|
| 3,622,225 | 11/1971 | Buchman et al. | 372/106 |
| 3,815,036 | 6/1974 | Nozik | 372/103 |
| 4,009,453 | 2/1977 | Mahleim | 372/99 |
| 4,084,883 | 4/1978 | Eastman et al. | 378/99 |
| 4,201,954 | 5/1980 | vander Wal et al. | 372/99 |
| 4,573,156 | 2/1986 | Anthony et al. | 372/99 |
| 4,615,033 | 9/1986 | Nakano et al. | 372/92 |
| 4,615,034 | 9/1986 | Von Gunter et al. | 372/99 |
| 4,685,110 | 8/1987 | DeBell et al. | 378/103 |

FOREIGN PATENT DOCUMENTS

| | | |
|---|---|---|
| 2060525 | 7/1971 | Fed. Rep. of Germany . |
| 2342911 | 3/1974 | Fed. Rep. of Germany . |
| 2075746 | 11/1981 | United Kingdom . |

Primary Examiner—Leon Scott, Jr.
Attorney, Agent, or Firm—Hill, Van Santen, Steadman & Simpson

[57] ABSTRACT

An inert gas ion laser includes a Brewster window having a plurality of alternating layers of high and low refractive index materials for suppression of unwanted laser frequencies to produce a narrow band transmissive Brewster window with a high power output.

9 Claims, 1 Drawing Sheet

U.S. Patent
Jan. 24, 1989
4,800,568
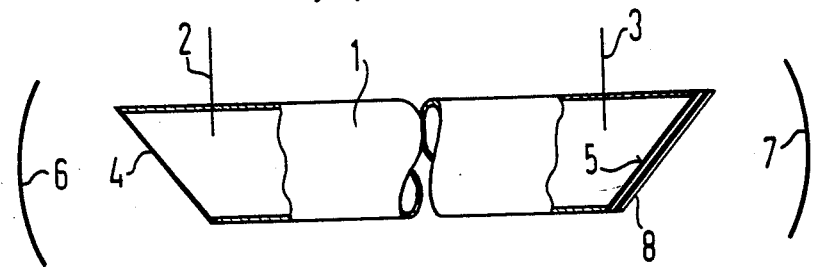
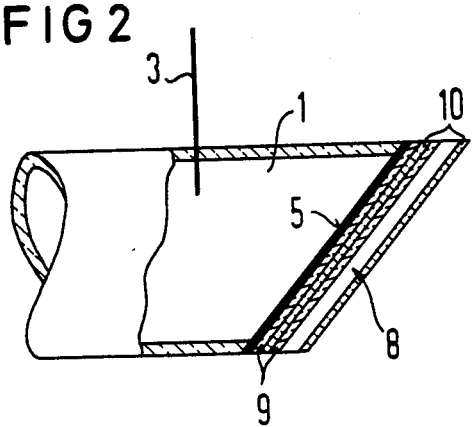

GAS LASER WITH A FREQUENCY-SELECTIVE DIELECTRIC LAYER SYSTEM

BACKGROUND OF THE INVENTION

1. Field of the Invention

The present invention relates to a gas laser having a frequency-selective multiple layer system formed on a Brewster window of the laser discharge tube.

2. Description of the Prior Art

It is known in the art to provide means for suppressing a single wavelength of the plurality of wavelengths usually emitted by a gas laser. For example, German Pat. OS No. 23 42 911 discloses coating one of two resonator mirrors (in a gas laser) wherein the coating includes a $\lambda/2$ wavelength layer and symmetrically disposed on either side thereof a plurality of pairs of alternating optically dense and optically thin $\lambda/4$ wavelength layers, where $\lambda$ is the wavelength of the unwanted light. Such a layer system yields a pronounced reflection minimum. A defined wavelength, or line, can be filtered out from a series of laser lines that are in relatively close proximity. However, suppressing all but one line of a spectrum of lines with such layer system does present problems.

A modified coating could be used to obtain suppression of all but one frequency but the reflection maximums of such layer structures as are required for such suppression are temperature and pressure dependent to such an extent as to result in a noticeable loss of power such as, for example, in an $Ar^+$ laser which has relatively close wavelength spacings. By applying dielectric cut-off filters to both mirrors the conditions for wavelength selection are less critical, although greater costs and more complex manufacturing are involved since the soft material of the mirror surface, which is frequently curved, must be polished and coated.

It is also known to use etalons, frequency-selective polarizers or dispersing elements for line selection (see German Pat. OS. No. 20 60 525 or GB OS No. 20 75 746), in conjunction with broad band mirrors. Such additional elements in the resonator however, attenuate the output beam and make the structure more complicated.

SUMMARY OF THE INVENTION

The present invention provides a simple and reliable means for suppressing unwanted frequency components of a laser emission by providing a plurality of layers at a Brewster window of a laser discharge tube. The layers are of alternating high refractive index and low refractive index and each has the same optical thickness. No additional parts or elements are required, and a gas laser utilizing the present invention can be fabricated at relatively low cost.

The Brewster window of a gas laser is usually composed of a hard, easily polishable material, such as quartz, having planar surfaces, and as such it is easy to bloom and coat. The mutiple layer structure includes only two type of layers. The thickness of the layers can depart from an ideal thickness value by up to a few percent, so long as layers of the same type are of the same thickness. Compared to frequency-selective mirrors, the present invention provides the advantages of approximately the same attenuation values for both useful and unwanted light frequencies and is somewhat less influenced by changes in temperature and pressure.

DESCRIPTION OF THE DRAWING

FIG. 1 is a gas laser tube, partially in cross section, including a frequency selective dielectric layer system according to the present invention; and FIG. 2 is an enlarged cross-section showing the multiple layer system of the gas laser shown in FIG. 1.

DESCRIPTION OF THE PREFERRED EMBODIMENTS

In the FIG. 1, a gas laser is shown including a discharged tube 1 provided with discharge electrodes 2 and 3 adjacent respective ends, and the ends of the discharge tube 1 are provided with respective Brewster windows 4 and 5. A resonator is formed by mirrors 6 and 7 disposed beyond the ends of the discharge tube 1. A multiple dielectric layer system 8 is provided at one Brewster window 5 on the side toward the mirror 7. An ideal value for the layers is $$\frac{2q + 1}{4} \lambda,$$

where $\lambda$ is the wavelength of the desired laser emission line and q is a whole number greater than or equal to zero.

The present frequency-selective layer system or means is preferably used with inert gas ion lasers, and, for purposes of illustration, is described in conjunction with an argon ($Ar^+$) laser having a desired emission frequency of 0.488 $\mu$m. The layer system provided on the argon-filled discharge tube 1 includes twelve individual layers 9 and 10 which alternately have a refractive index of 2.2 and 1.46, respectively, and a thickness of 71.2 nm and 120.5 nm respectively. The layers are formed of vapor-deposited $Ta_2O_3$ and, respectively, $SiO_2$. The Brewster windows 4 and 5 are formed of either quartz or silica.

For p-polarized light at a 55.5° angle of incidence, the following reflection factors $R_P$ are derived for individual laser lines $\lambda_i$ with their excitation probabilities A:

| $\lambda_i$ (nm) | $R_p$ (%) | A |
|---|---|---|
| 454 | 11 | 0.12 |
| 456 | 12 | 0.35 |
| 466 | 13 | 0.2 |
| 473 | 9.7 | 0.3 |
| 476 | 7.4 | 0.75 |
| 488 | 0.000 | 1.5 |
| 496 | 6.8 | 0.7 |
| 501 | 17.7 | 0.4 |
| 514 | 51 | 2.0 |

For layer thickness errors of $\pm 1$ percent and for stray light and absorption losses totaling less than 0.05 percent, the losses for the 0.488 $\mu$m wavelength line amount to about 0.2 percent. The remaining laser wavelength lines are suppressed; in particular, the 0.514 $\mu$m wavelength line is suppressed, which is greatly excited since its $R_p$ value is especially high precisely in this frequency range.

Although an argon laser has been described in conjunction with the present invention, the multiple layer system can also be used for the selection of other $Ar^+$ wavelength lines or for the selection of wavelengths of other inert gas lasers and, in suitable instances, can even be employed for the selection of more than one frequency line.

The low-refraction and/or the high-refracting layers can be selected to be thicker to boost frequency selectivity, such as where q is greater than one. Partial application of the multiple layer system to the inside of a Brewster window is also possible, and the provision of layers to both sides of the window provides thermal stability. It is also foreseen to apply the layers by some method other than vapor depositing, such as by means of a sputtering technique. Furthermore, it is inconsequential whether the Brewster windows forms a gastight tube closure or is held in a purely mechanical fashion. Thus, there has been shown and described a frequency selective dielectric layer system for a gas laser which is economical to manufacture and efficient in operation.

It is apparent from the foregoing specification, the invention is susceptible to being embodied with various alterations and modifications which may differ particularly from those that I have described in the preceding specification and description. It should be understood that I wish to embody within the scope of the patent granted hereon all such modifications as reasonably and properly come within the scope of my contribution to the art.

We claim as our invention:

1. In a gas laser having a discharge tube provided with a Brewster window adjacent at least one of its two opposite ends through which laser radiation is emitted, an improvement comprising means for allowing passage of only one wavelength and absorbing all others, said means being a frequency selective layer system being formed on the Brewster window, said system comprising:

a plurality of successive layers, said plurality of layers including only two layer types and including alternating high refractive index first layers and low refractive index second layers, each of said first layers having substantially a first optical thickness and each of said second layers having substantially a second optical thickness, said plurality of successive layers including between five and nine layers of each of said first layers and of each of said second layers, each of said first layers having an optical thickness of at least $0.98d_1$ and at most $1.02d_1$, where $d_1$ is a constant and is at least $$0.8\left(\frac{2q+1}{4}\right)\lambda$$

and at most $$1.2\left(\frac{2q+1}{4}\right)\lambda$$

and each of said second layers having an optical thickness of at least $0.98d_2$ and at most $1.02d_2$, where $d_2$ is a constant and is at least $$0.8\left(\frac{2q+1}{4}\right)\lambda$$

and at most $$1.2\left(\frac{2q+1}{4}\right)\lambda,$$

where $\lambda$ is a wavelength of a desired laser emission and q is a positive whole number.

2. An improved layer system as claimed in claim 1, wherein the optical thickness of said first layers is at least $0.99d_1$ and at most $1.01d_1$ where $d_1$ is at least $0.9\lambda/4$ and at most $1.1\lambda/4$, and the optical thickness of said second layers is at least $0.99d_2$ and at most $1.01d_2$ where $d_2$ is at least $0.9\lambda/4$ and at most $1.1\lambda/4$.

3. An improved layer system as claimed in claim 1, wherein the difference in refractive index between the high refractive index layers and the low refractive index layers is at least 0.5.

4. An improved layer system as claimed in claim 3, wherein the refractive index for the high refractive layers is at least 1.9 and at most 2.5, the refractive index for the low refractive layers is at least 1.38 and at most 1.85, and the difference in refractive index between the low refractive layers and the high refractive layers is at least 0.5.

5. An improved layer system as claimed in claim 1, wherein said layer system is for use on an argon laser having a desired emission wavelength of 0.488 μm, at least 6 layers of each of said first layers and said second layers, the refractive index of said first high refractive layers being at least 2.1 and at most 2.3, and the refractive index of the second low refractive layers being at least 1.4 and at most 1.5.

6. An improved layer system as claimed in claim 5, wherein said high refractive layer has a refractive index of 2.2 and said low refractive layer has a refractive index of 1.46, and said high refractive layer having a thickness of 71.2 nm and said low refractive layer having a thickness of 120.5 nm.

7. An improved layer system as claimed in claim 1, wherein said first and second layers are disposed on an outside surface of said Brewster window.

8. An inert gas ion laser, comprising:
a discharge tube having first and second opposite ends;
a Brewster window adjacent at least one of said opposite ends; and
layer means being formed on the Brewster window for allowing passage of only one wavelength and absorbing all others, said layer means comprising: a plurality of alternating first and second layers being formed on said Brewster window, said first and second layers being the only types being applied to said Brester window, said first layer having a refractive index different from said second layer by at least 0.5, each of said first layers being of substantially identical optical thickness, each of said second layers being of substantially identical optical thickness, said optical thickness of each of said first and second layers varying no more than 2 percent, said optical thickness of each of said first and said second layers being in the range of at least $0.8\lambda(2q+1)/4$ and at most $1.2\lambda(2q+1)/4$, where $\lambda$ is a desired laser emission wavelength and q is a positive whole number.

9. In an argon gas laser having a desired emission wavelength of 0.488 μm and a discharge tube provided with a Brewster window adjacent at least one of its two opposite ends through which laser radiation is emitted, an improved frequency selective layer system comprising:

a plurality of successive layers on said Brewster window, said plurality of layers including only two layer types and including alternating high refractive index first layers and low refractive index second layers, each of said first layers having substantially a thickness of 71.2 nm and each of said second layers having substantially a thickness of 120.5 nm, said plurality of successive layers including between six and nine layers of each of said first layers and of each of said second layers, each of said first layers being formed of $Ta_2O_3$ and having a refractive index of 2.2 and each of said second layers being formed of $SiO_2$ and having a refractive index of 1.46.

* * * * *